United States Patent [19]
Ward

[11] Patent Number: 5,480,496
[45] Date of Patent: Jan. 2, 1996

[54] METHOD OF MAKING TWIN ROLL CAST CLAD MATERIAL USING DRAG CAST LINER STOCK AND ARTICLE PRODUCED THEREBY

[75] Inventor: Bennie R. Ward, Richmond, Va.

[73] Assignee: Reynolds Metals Company, Richmond, Va.

[21] Appl. No.: 219,069

[22] Filed: Mar. 29, 1994

[51] Int. Cl.$^6$ ............................. C22C 21/00; B32B 15/00
[52] U.S. Cl. ................... 148/437; 148/400; 148/516; 148/522; 148/523; 148/527; 148/535; 164/419; 164/428; 164/429; 164/461; 164/479; 164/480; 428/615; 428/636; 428/650; 428/654; 428/686
[58] Field of Search ............................. 148/437, 400, 148/516, 522, 523, 527, 535; 164/419, 428, 429, 461, 479, 480; 427/398.2, 431, 436; 428/615, 636, 650, 654, 686

[56] References Cited

U.S. PATENT DOCUMENTS

| | | | |
|---|---|---|---|
| 2,128,941 | 9/1938 | Hudson | 164/428 |
| 2,931,082 | 4/1960 | Brennan | 164/461 |
| 4,224,978 | 9/1980 | Klein | 164/461 |
| 4,945,974 | 8/1990 | Honeycutt, III | 164/479 |
| 5,077,094 | 12/1991 | McCall et al. | 427/319 |
| 5,106,433 | 4/1992 | Nakamura et al. | 148/546 |

FOREIGN PATENT DOCUMENTS 1364758  10/1964  France .

OTHER PUBLICATIONS

PCT International Application WO 94/13472, published 23 Jun. 1994, for Clad Metallurgical Products and Method of Manufacture.

Primary Examiner—David A. Simmons
Assistant Examiner—Robert R. Koehler
Attorney, Agent, or Firm—Alan M. Biddison

[57] ABSTRACT

A method of making twin roll cast clad material includes producing a composite material using a liner stock produced by drag casting techniques. The drag cast liner stock can be directly used in a twin roll continuous casting process without additional process steps such as heat treatment, surface cleaning and/or rolling. The drag cast liner stock can be applied to one or both of the surfaces of the twin roll cast material to produce a composite material that is useful in a cast form or can be adapted for reduction by rolling processes or the like. The twin roll cast cladding process can utilize aluminum alloy core and cladding materials to form a brazing sheet from the as-cast composite material.

11 Claims, 2 Drawing Sheets

METHOD OF MAKING TWIN ROLL CAST CLAD MATERIAL USING DRAG CAST LINER STOCK AND ARTICLE PRODUCED THEREBY

FIELD OF THE INVENTION

The present invention is directed to making a clad material using a twin roll casting process and a drag cast liner stock as the cladding material, and, in particular, cladding a drag cast brazing material on a twin roll cast aluminum core material.

BACKGROUND ART

The prior art has proposed various methods and apparatus to produce composite materials. U.S. Pat. No. 2,931,082 to Brennan discloses a casting method and apparatus wherein a composite metal article is formed by continuously casting molten metal against a longitudinally moving base such as a metal strip or the like. In Brennan, a strip is disposed between the material being cast and a rotating casting wheel.

U.S. Pat. No. 5,077,094 to McCall et al. discloses a process for applying a metal coating to a metal strip substrate. In this process, a melt pool of a metal coating material is deposited on a casting surface of the substrate material and rapidly cooled to form the coated metal strip.

U.S. Pat. No. 4,224,978 to Klein discloses a twin roll casting method and apparatus for forming a composite material. In this method, a material having a mechanical strength and melting point substantially higher than that of aluminum is plated on at least one face of a continuously cast aluminum core material. Referenced in this patent is French Patent No. 1,364,758 which describes in principle a continuous casting method in which still liquid metal is introduced between two cooled work rolls and in which a metal plating strip is interposed between the liquid metal and the work rolls. The metal plating strip is thus plated onto the continuously cast material. This French patent discloses plating an aluminum blank with a strip of aluminum.

In the prior art, it is also known to provide a brazing sheet comprising a core of an aluminum alloy and a brazing material, i.e. a coating of a lower melting point filler metal. Typically, the coatings are roll bonded to one or both sides of the core sheet during fabrication. Brazing sheet can then be formed without removing the coating, assembled, fluxed and brazed without placing additional filler metal at a joint site.

In one type of roll bonding, the brazing material is bonded to a core material at an ingot stage. The bonded ingot must then be hot rolled to brazing sheet thicknesses, typically 0.125". This hot rolling step is conducive to the formation of surface oxides which impair the quality of the brazing sheet and can adversely affect brazing performance.

Alternatively, the filler metal can be produced by casting into an ingot form and rolled to a thin gauge liner stock. After rolling, the wrought filler metal can be roll bonded to the aluminum core material using conventional techniques. This method requires numerous annealing and surface preparation steps to prepare the thin gauge liner stock for bonding. The core material may vary depending on the application. AA3003 or AA6951 aluminum alloys are typical examples of core materials. The brazing filler metals can also vary depending on the desired use, usually comprising an AA4XXX-type aluminum alloy.

Besides the drawbacks noted above concerning excessive surface oxides in hot rolled brazing sheet and the additional processing steps of annealing and surface cleaning for wrought liner stock, prior art methods of making brazing sheet lack the ability to vary the cladding or filler metal composition for a given core material.

In response to the drawbacks and disadvantages of the prior art discussed above, a need has developed to provide an improved method for making twin roll cast composite materials offering flexibility in choice of composition, cost effectiveness and energy efficiency.

In response to this need, the present invention provides a method for making a twin roll cast clad material having an acceptable structure and quality in combination with low operating and capital costs and the ability to utilize different brazing filler materials with a single core material.

SUMMARY OF THE INVENTION

Accordingly, it is a first object of the present invention to provide an improved method of making a twin roll cast clad material using a drag cast material as a cladding liner stock.

Another object of the present invention is to produce a brazing sheet which utilizes a drag cast liner stock as the filler metal in a twin roll continuous casting method.

It is a further object of the present invention to produce a composite material by cladding a drag cast liner material to a twin roll cast aluminum core wherein different compositions of liner material are clad to the cast material across its width.

Another object of the present invention is to provide a composite material, in particular, a brazing sheet, made by twin roll casting a core material to a drag cast liner stock.

Other objects and advantages of the present invention will become apparent as a description thereof proceeds.

In satisfaction of the foregoing objects and advantages, the present invention provides an improvement in the method of cladding liner material to a material being continuously twin roll cast. According to the invention, a drag cast liner material is formed by melting the liner material, feeding the molten liner material onto a unitary rotating chill wheel and solidifying the liner material into a strip. This process forms a liner material having a drag cast structure which is then fed between the rolls of a twin roll casting apparatus with a molten material to be cast to form a composite structure.

The material to be twin roll cast can be any castable alloy, preferably an aluminum alloy. The drag cast liner material can also be any castable alloy, preferably a brazing alloy such that the composite structure formed is a brazing sheet.

In another aspect of the invention, drag cast liner materials of different compositions, widths and thicknesses can be clad to the twin roll cast material at laterally spaced apart intervals to form a cast structure having clad and unclad portions.

In a more preferred embodiment, the grooved surface formed during drag casting of the drag cast liner stock is orientated to contact the material to be cast during twin roll casting.

According to the invention, a twin roll cast composite strip of material is produced comprising a twin roll cast core material having opposing surfaces and a liner material having a drag cast structure bonded to at least a portion of one of the opposing surfaces. In a more preferred embodiment, the liner material having the drag cast structure is bonded entirely to one or both of the opposing surfaces. Alternatively, the liner material is bonded in laterally spaced apart intervals to provide a multi-functional composite material. A twin roll cladding casting apparatus is also disclosed wherein the cladding liner for use during twin roll casting includes means to feed a plurality of cladding liners between the rotating casting rolls and a molten material being cast. With this apparatus, a cast structure is formed having both clad and unclad portions to provide a multi-functional end product.

BRIEF DESCRIPTION OF THE DRAWINGS

Reference is now made to the drawings accompanying the invention wherein.

DESCRIPTION OF THE PREFERRED EMBODIMENTS

The use of a drag cast liner stock as a cladding material in a twin roll continuous casting process produces an acceptable composite material, particularly useful as a brazing sheet or strip. This use also eliminates the increased production cost associated with prior art wrought cladding material. The drag cast liner material also provides a sufficiently clean surface to avoid any surface preparation steps prior to the twin roll cast cladding.

Figure 1:
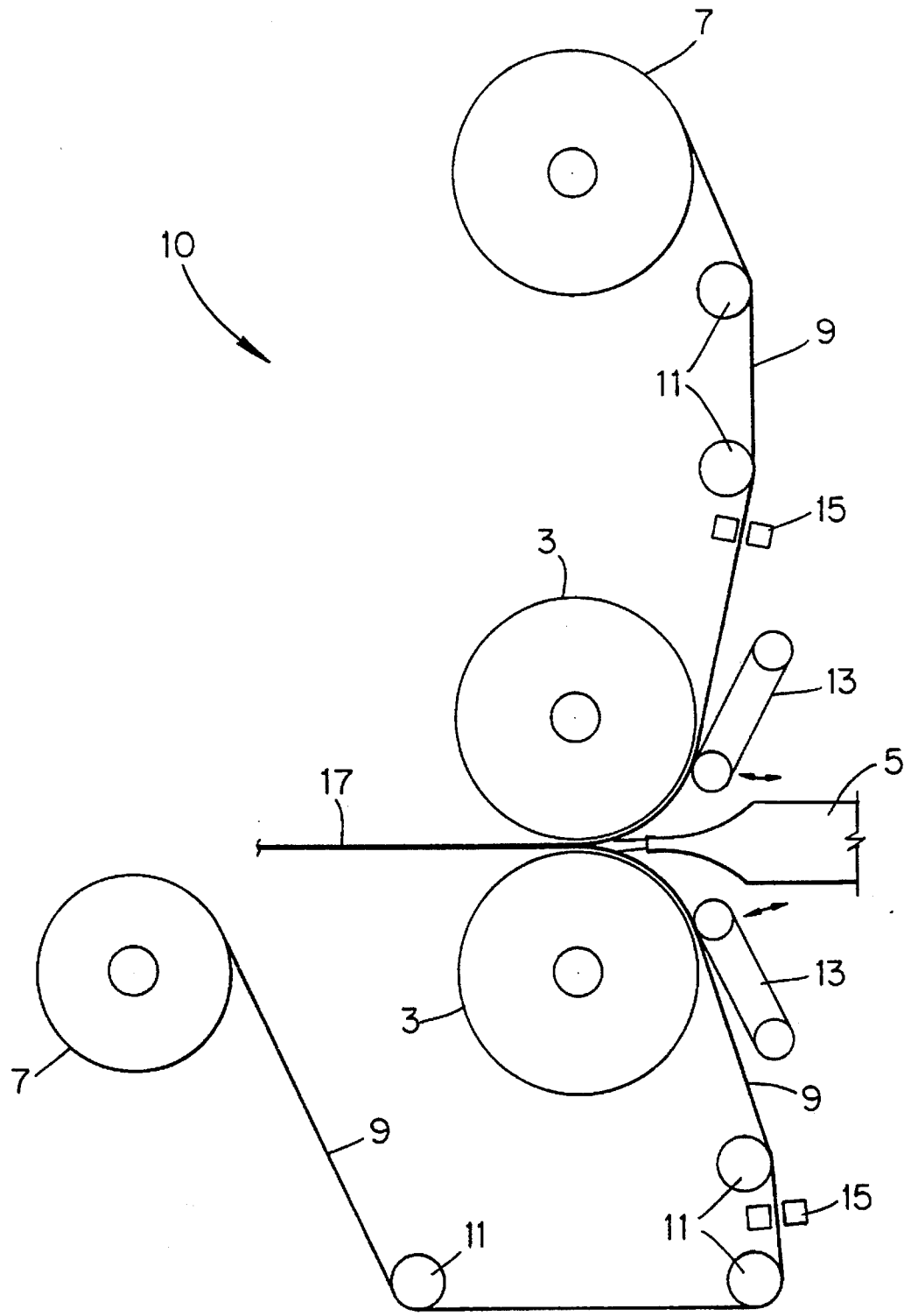
FIG. 1 is a first schematic diagram of the inventive method and apparatus.

With reference to FIG. 1, the present invention is generally designated by the reference numeral 10 and includes a twin roll casting apparatus 1 comprising a pair of casting rolls 3 and a casting tip 5. It should be understood that the twin roll casting apparatus is well known in the art and not considered to be an aspect of the invention.

A pair of cladding stock coils 7 are provided adjacent the twin roll casting apparatus 1. The cladding stock coils dispense the cladding liner stock 9 via guide rolls 11 and ironing rolls 13 to the twin roll casting wheels 3, respectively. Edge guide sensors 15 may also be provided to maintain transverse and longitudinal alignment between the liner stock 9 and the casting wheels 3 through adjustment of the various rolls. Since these sensors are well known in the art, a further description is not deemed necessary.

The liner stock 9 is a cast material produced by drag casting molten material into a metal strip. This drag casting process is disclosed, for example, in U.S. Pat. No. 4,945,974 to Honeycutt, Ill. which is incorporated in its entirety by reference. In this process, a thin strip of cast material is produced by a single cooling wheel which drags molten metal from an adjacent tundish. The single cooling wheel solidifies the molten metal into a thin strip, typically between 0.030 to 0.050 inches at a rate of in excess of 200 ft. per minute.

Still with reference to FIG. 1, during twin roll casting, molten metal (not shown) fed through the casting tip 5 is formed into a sheet material with the liner stock made from the drag cast material 9 being reduced and bonded thereto to produce a composite strip material 17.

The composite strip material 17 may be utilized in its as cast form depending on the core material composition, liner stock composition and intended use. Typically, the as cast composite has a thickness up to ½ inch and can vary in width depending on the twin roll casting apparatus, typically up to 80". Alternatively, the composite material can be further reduced by rolling or the like and/or heat treating depending on the desired end use, size and properties.

The core material and drag cast liner stock material can be any metal or alloy composition providing that the core material can be continuously twin rolled cast and the liner stock material can be drag cast. In addition, the core material should be compatible with the drag cast liner stock so that sufficient bonding therebetween can be achieved during the twin roll casting and cladding step.

Preferably, the composite material produced by the twin roll cast cladding process is used as a brazing sheet. That is, the core material is an aluminum or aluminum alloy with the drag cast liner stock material being a brazing filler alloy such as AA4045 or the like.

Using a brazing filler alloy as the drag cast liner stock offers advantages over prior art techniques which use a wrought alloy as a cladding material during twin roll casting or bond the cladding material at the ingot stage and reduce it to brazing sheet by hot rolling.

During drag casting, an oil free, relatively, clean surface is produced. Thus, the drag cast liner stock may be directly fed to the twin roll casting apparatus without the need for extensive annealing and/or surface preparation steps. In contrast, wrought alloys that are produced from ingots or continuously cast slabs, require numerous annealing and surface cleaning steps before they can be used in a twin roll casting process. By using drag cast material as the liner stock in the inventive process, these numerous intermediate process steps are avoided which reduce operating and capital costs and increase energy efficiency.

When producing brazing sheet, the as cast composites are typically further cold rolled to thicknesses of about 0.125 inches for brazing sheet use. Of course, the final thickness of the brazing sheet can be tailored to the particular brazing sheet application. Alternatively, the drag cast liner stock composition to be clad during twin roll casting can be selected for other characteristics such as corrosion resistance, increased strength or improved surface appearance, either in the cast form or when further reduced and/or heat treated.

Although FIG. 1 illustrates cladding the drag cast liner to both surfaces of the cast core material, a single liner stock can be applied to the twin roll cast core material. The single liner stock can be applied to the bottom or the top surface as shown in the schematic of FIG. 1.

It should also be understood that the drag cast liner stock can be bonded to the cast core material with either the grooved surface or the non-grooved surface facing the core material.

In drag casting, a grooved chill wheel is typically used to solidify the molten metal. The grooved chill wheel produces a cast product having a grooved surface on one side with a smoother opposite side which is in contact with atmosphere during solidification. The side opposite the grooved surface is typically characterized as the air side surface.

When cladding the drag cast liner stock to the core material during twin roll casting, the drag cast liner stock can be configured with either the air side surface or the grooved surface contacting the molten material during casting. Preferably, the drag cast liner stock is dispensed from the coil such that the grooved surface contacts the core material rather than the air side surface.

As will be described hereinbelow, experiments have indicated that when the grooved surface of the drag cast liner stock faces the core material during twin roll casting, an improved composite material is produced. That is, less blistering occurs in the cast composite material surface and the surface of brazing sheet made therefrom by further cold rolling. It is believed that the grooved surface contacting the molten metal during twin rolled casting permits or facilitates the escape of gas during the casting process. By avoiding the entrapment of gas, an improved quality product is provided whether as cast or when further reduced by rolling or the like.

Figure 2:
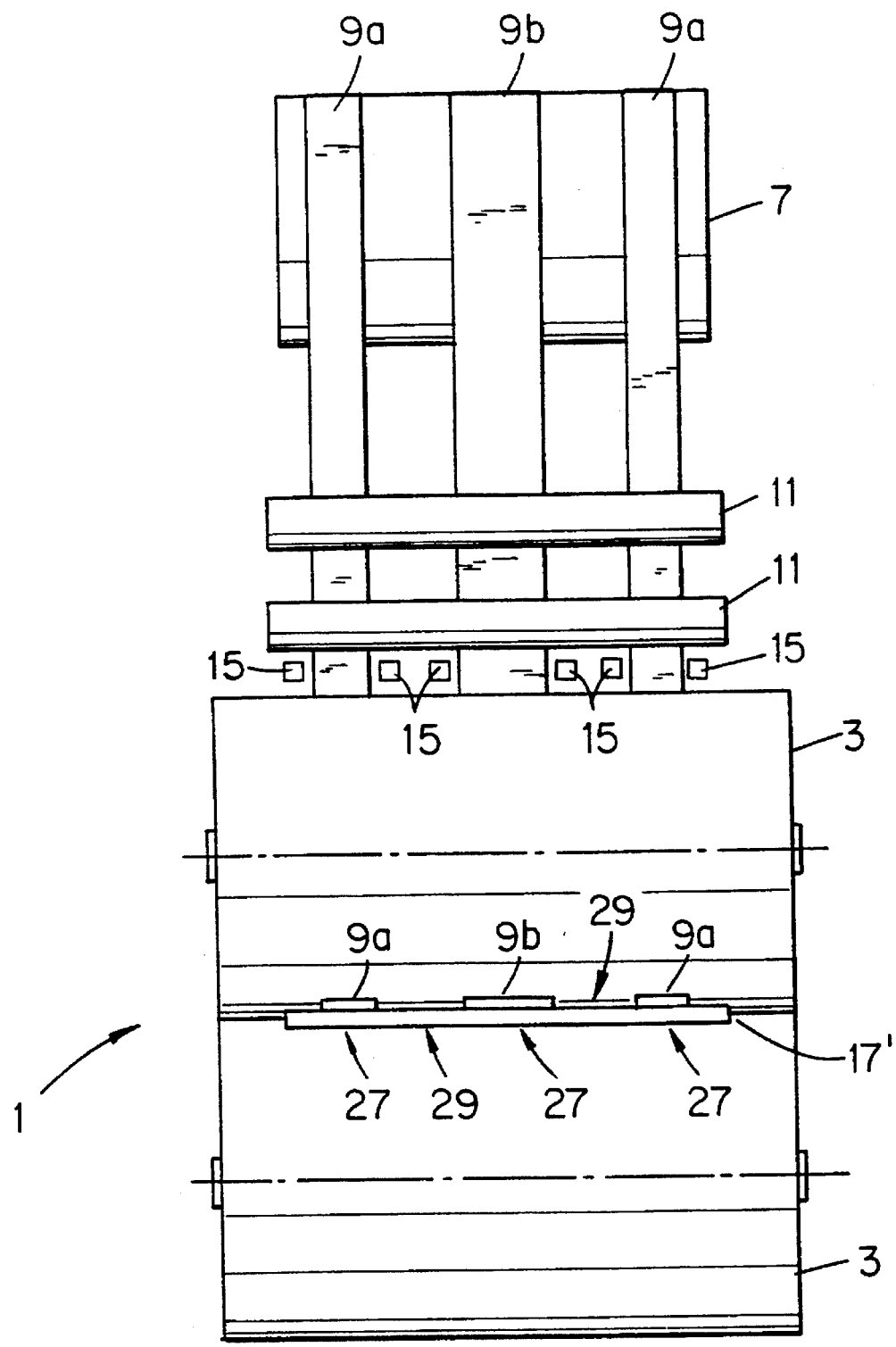
FIG. 2 is a second schematic view depicting another embodiment of the present invention.

In another embodiment of the invention, with reference to FIG. 2, the drag cast liner stock can be bonded to the core material at spaced apart intervals. In FIG. 2, only a single coil is shown for cladding to the twin roll cast material. However, cladding may be done on both sides of the cast material. The coil 7 includes a pair of drag cast strips 9a, each strip 9a spaced from a centrally located wider strip 9b.

According to the inventive method, each of the strips 9a and 9b can be clad during twin roll casting to form a composite material 17'. The composite material 17' has composite areas 27 which are adjacent portions 29 which comprise only the core material.

Edge guides 15 are provided for each of the strips 9a and 9b to assure proper alignment during the cladding and twin roll casting process.

By selectively bonding the drag cast material 9a and 9b to the core material, a versatile composite material is produced which is multi-functional in use. For example, the drag cast material 9a can be a different composition-than the material 9b. Thus, the composite strip 17' can then be slit or cut to individually utilize the different composition composite portions 27. The composite portions 27 can also be tailored for different widths to accommodate a desired end use. In addition, the thickness of the drag cast materials 9a and 9b can also vary depending on the end use.

The composite strip 17' can be stored as inventory and used at a later date depending on the need for a particular type of composite material. This aspect is especially advantageous when the drag cast materials 9a and 9b are brazing filler alloys for an aluminum core material. Several different types of brazing sheets can be manufactured using the inventive method.

In order to demonstrate the viability of the present invention and improvements associated therewith, various drag cast liner stocks were clad to twin roll cast core material.

In a first experiment, a 0.045" thick by 25" wide AA4045 alloy drag cast liner was successfully clad to an AA3003 core material by twin roll casting. An AA4045 alloy with the addition of 1.5 wt. % magnesium was also twin roll cast to the AA3003 alloy. The composite material was cast at a thickness of about 0.420".

In a second experiment, a drag cast aluminum-iron-silicon-copper liner stock having a thickness of 0.045" was also successfully clad to an AA3003 alloy during twin roll casting thereof.

In each experiment, successful bonding of the drag cast liner stock to the core material was achieved. Typically, the drag cast liner stock had a 25% reduction (0.045" to 0.033" in the composite casting). The percent cladding in the composite material was about 8%.

Successfully cladding of the drag cast liner stock to the twin roll cast core material provides a more consistent composite material and eliminates ingot hot rolling and roll bonding methods. In addition, a greater percent product recovery is achieved by the inventive method.

After the drag cast liner stock was twin roll clad cast in the first experiment, the cast composite material was cold rolled to 0.125" annealed at 750° F., cold rolled to 0.060" and final annealed at 675° F. The non-magnesium containing drag cast liner was cold rolled to 0.013" and stressed relieved at 550° F. The metal to metal bond was deemed satisfactory after cold rolling by the absence of delaminations in the rolled product.

It should be understood that the casting conditions such as the casting wheel diameters and width, casting tip set back, tundish temperature, casting amperage and casting speed are variable dependent and are selected depending on variables such as the properties of the core material and drag cast liner stock. Preferably, the clearance between the casting strip and the drag cast liner covered wheel is minimized so as to prevent instability of the meniscus during casting. In addition, it is preferred to limit the casting speed to obtain adequate reduction of the core material to enhance bonding. Other casting conditions which may be adjusted include roll gap setting, cladding reduction during bonding, casting temperature and tip configuration.

In a third series of experiments, two coils of drag cast liner stock AA4045 and one wrought strip of AA4045E (caustic etched) were twin rolled clad cast on an AA8111-type aluminum alloy.

During casting, the two coils of the drag cast liner stock AA4045 were fed simultaneously into a twin roll caster. One coil was fed with the grooved surface contacting the core material with the other coil being fed with the non-grooved surface contacting the core material. The AA4045 etched sheet was clad on one side of the twin roll cast core material.

In each instance of twin roll cast cladding, the composite material included non-bonded areas. It was noted that the composite material having the grooved surface of the drag cast liner stock facing the core material had the fewest non-bonded areas.

The twin roll cast clad composite materials were then cold rolled to 0.060" and annealed at 675° F. for two hours.

Visual examination of the cold rolled and annealed composite materials revealed the existence of blisters on each of the samples cast.

The composite material with the drag cast liner stock having the grooved surface facing the core material had the least number of fine blisters and appeared to be of acceptable quality. In contrast, the composite with the drag cast liner stock non-grooved surface facing the core material had blisters about 1½" wide and over 12" long in the rolling direction in selected areas.

The cladding thickness was also determined for the as cast samples. The AA4045E sample had a cladding thickness of 8.6%. In contrast, the drag cast liner stock with the grooved surface facing the core material had a cladding thickness of 10.4%. The sample with the non-grooved surface facing the core material had a cladding thickness of 9.4%.

It was also discovered that the drag cast liner stock provides a surface that is sufficiently clean and dry to afford a good metallurgical bond without any surface treatment. In a series of fourth casting experiments, one half of a drag cast liner stock was caustic etched with the other half remaining untreated. The partially etched liner stock was then cold rolled from 0.100" to a final gauge of 0.045". No difference in bonding ability was detected between the etched and non-etched samples when this liner stock was twin roll clad cast. This indicates that the drag cast liner stock affords a sufficiently clean surface to permit proper metallurgical bonding without any extensive surface preparation treatment.

The brazeability of the twin roll clad cast composite materials produced in the third series of experiments was also investigated. The clad cast materials, after being homogenized at 6 hours at 850° F., cold rolled to 0.06" and annealed at 675° F. for two hours, were brazed in a CAB furnace using a NOCOLOK type flux. After brazing, fillet sizes were measured and the average fillet area was calculated. A comparison between the two different type drag cast materials, i.e. grooved or non-grooved surface facing the core material, revealed that the composite material with the drag cast liner stock grooved surface facing the core material exhibited smaller fillet areas. Although the brazeability study indicates that the preferred cladding orientation is to have the grooved surface of the drag cast liner stock contact the core material, in each instance, successful brazing was achieved.

Although various thicknesses and widths have been disclosed for the drag cast liner stock and twin roll cast clad material, preferred thickness and widths are dependent on the respective casting conditions and desired end uses. Drag cast liner stock can be cast in widths up to 80" with a cast thickness ranging between 0.03 to 0.06". Likewise, although the twin roll cast composite material has been exemplified at 0.42" other thicknesses are within the scope of the invention. Likewise, the composite material may be further cold rolled and heat treated to achieve properties and sizes consistent with a desired end use.

The inventive method also produces a novel composite material by the combination of a cast structure as a cladding material with a twin roll cast core material. In addition, by cladding the drag cast material with the grooved surface facing the core material to be cast and allowing the escape of gases through the grooves during the casting process, an improved composite product is obtained. Further, since the non-grooved smooth surface of the drag cast liner stock becomes the exposed surface of the composite material, the composite is conducive to further cold reduction, if necessary.

As such, an invention has been disclosed in terms of preferred embodiments thereof which fulfill each and every one of the objects of the present invention as set forth hereinabove and provides a new and improved method of twin roll cast cladding and article produced thereby.

Of course, various changes, modifications and alterations from the teachings of the present invention may be contemplated by those skilled in the art without departing from the intended spirit and scope thereof.

What is claimed is:

1. A twin roll cast metallic composite strip material comprising:
    a) twin roll cast metallic core material having opposing surfaces; and
    b) a metallic liner material having a drag cast structure bonded to at least a portion of one of said opposing surfaces.

2. The twin roll cast metallic composite strip material of claim 1 wherein said metallic core material has said metallic liner material bonded to both opposing surfaces.

3. The twin roll cast metallic composite strip material of claim 1 wherein said metallic liner material is bonded to one of said opposing surfaces at laterally spaced apart intervals.

4. The twin roll cast metallic composite strip material of claim 1 wherein said metallic core material is an aluminum alloy, said metallic liner material is a brazing alloy and said metallic composite strip material is a brazing sheet.

5. The twin roll cast metallic composite strip material of claim 3, wherein said metallic liner material bonded at laterally spaced apart intervals comprises at least two different alloys.

6. The twin roll cast metallic composite strip material of claim 5 wherein said at least two different alloys are brazing alloys, said metallic core material is an aluminum alloy and said metallic composite strip material comprises at least two different brazing sheets.

7. The twin roll cast composite strip of claim 1, wherein the metallic liner material has a grooved surface that faces the metallic core material.

8. A metallic composite structure produced by the method of cladding a metallic liner material to a metallic material continuously twin roll cast wherein said metallic liner material is fed between at least one of said twin rolls and said metallic material being cast, the improvement wherein said metallic liner material has a drag cast structure and is fed between at least one of said twin rolls and said metallic material being cast to form the metallic composite structure.

9. The metallic composite structure of claim 8, wherein the metallic liner material has a grooved surface that is fed facing said metallic material being cast.

10. A metallic composite structure produced by the method of cladding a metallic liner material to a metallic material continuously twin roll cast wherein said metallic liner material is fed between at least one of said twin rolls and said metallic material being cast, the improvement wherein said metallic liner material has a drag cast structure formed by melting an aluminum alloy, feeding said aluminum alloy onto a unitary rotating chill wheel from a tundish and solidifying said metallic liner material into a metallic strip, said metallic strip forming said metallic liner material.

11. The composite structure of claim 10, wherein the metallic liner metallic material has a grooved surface that faces the material being continuously twin roll cast.

* * * * *